United States Patent
Maquire et al.

(10) Patent No.: US 6,431,756 B2
(45) Date of Patent: Aug. 13, 2002

(54) BEARING DAMPER

(75) Inventors: Alan R Maquire, Derby; John W Allen, Burton on Trent, both of (GB)

(73) Assignee: Rolls-Royce plc, London (GB)

( * ) Notice: Subject to any disclaimer, the term of this patent is extended or adjusted under 35 U.S.C. 154(b) by 25 days.

(21) Appl. No.: 09/759,528

(22) Filed: Jan. 16, 2001

(30) Foreign Application Priority Data

Jan. 25, 2000 (GB) .............................................. 0001538

(51) Int. Cl.⁷ .............................................. F16C 27/00
(52) U.S. Cl. ...................................................... 384/99
(58) Field of Search .......................... 384/99, 462, 473, 384/474

(56) References Cited

U.S. PATENT DOCUMENTS

| | | | |
|---|---|---|---|
| 3,393,024 A | * | 7/1968 | Rhodes et al. ............... 384/316 |
| 4,693,616 A | | 9/1987 | Rohra |
| 5,044,781 A | * | 9/1991 | Werner ........................ 384/99 |
| 5,797,684 A | * | 8/1998 | Becker ......................... 384/99 |
| 5,971,706 A | * | 10/1999 | Glista et al. .................. 384/99 |

FOREIGN PATENT DOCUMENTS

| EP | 0 042 320 | 12/1981 |
|---|---|---|
| GB | 937 515 | 9/1963 |

\* cited by examiner

*Primary Examiner*—Thomas R. Hannon
(74) *Attorney, Agent, or Firm*—W. Warren Taltavull; Manelli Denison & Selter PLLC

(57) ABSTRACT

A vibration damper comprises a bearing located between two rotatable shafts and an axially extending oil entry surface positioned radially inwardly of the radial outer surface of the bearing outer race and axially adjacent one end of the bearing. The outer surface of the bearing outer race forms a clearance between itself and the bearing housing for the ingress of a film of oil directed from the oil entry surface. A weir is positioned at the axially opposite end of said bearing and radially inward of the bearing outer race and oil entry surface such that in use the radial height difference between oil entry surface and weir provides a pumping force and supplies a film of oil between the bearing outer race and its casing.

7 Claims, 3 Drawing Sheets

BEARING DAMPER

This invention relates to a vibration damper. More specifically but not exclusively this invention relates to an intershaft bearing damper where the bearing is situated between two rotating shafts. More particularly still this invention relates to a bearing damper suitable for use in a gas turbine engine.

Gas turbine engines in particular need to comply with rigorous safety standards. Vibration reduction is an essential part of safety improvement for gas turbine engines. Some gas turbine engines employ a concentric shaft arrangement with intershaft bearings provided between the shafts. One example of a concentric shaft arrangement is where the high pressure turbine of a gas turbine engine is mounted on a shaft concentric with the intermediate pressure turbine shaft, each turbine comprising a number of nozzle guide vanes (NGVs).

An arrangement of concentrically mounted and contra-rotating shafts produces vibration and a need has been identified for control of such vibration.

An intershaft bearing positioned between two rotating shafts is subject to radial loads known to cause the vibration problems in gas turbine engines. In order to try and limit the effect of such dynamic loads from the rotating assemblies to the bearing housings a 'squeeze film' type of bearings may be employed.

Such bearings have a small clearance between the outer race of the bearing and its housing, the clearance being filled with oil. The effect of the oil is to dampen the radial motion of the rotating assembly and the dynamic loads transmitted to the bearing housing thus reducing the vibration level of the gas turbine and hence the possibility of damage by fatigue.

However squeeze film damping of a bearing normally requires a pressurised oil supply of typically 100 psi. This supply is metered through a control orifice such that the squeeze film surfaces are fed with oil at typically 20 psi.

The problem of vibration control with intershaft bearings is associated with the need to supply pressurised oil to the squeeze film surfaces across the resultant junctions between the rotating shafts. A sealed oil supply operating at the above typical pressures would require extremely complex sealing arrangements which may inevitably prove to be unreliable, costly and heavy. It is also likely that the safety regulations for gas turbine engines would require such a potentially unreliable sealed pressurised system to be totally separate from the existing bearing lubrication system.

There is a need, therefore, for improved bearing damping which attempts to alleviate the aforementioned problems.

According to the present invention there is provided a vibration damper comprising a bearing located between two rotatable shafts, said bearing comprising an inner race and an outer race said outer race being located adjacent a bearing housing, An axially extending oil entry surface positioned radially inwardly of the radial outer surface of said outer race and axially adjacent one end of said bearing, the outer surface of said bearing outer race forming a clearance between itself and the bearing housing suitable for the ingress of a film of oil directed from said oil entry surface, a weir positioned at the axially opposite end of said bearing, said weir being radially inward of said bearing outer race and said oil entry surface whereby in use the radial height difference therebetween provides a pumping force thus supplying a film of oil between the bearing outer race and its casing.

Preferably said rotatable shafts are mounted concentrically.

The invention will now be described by way of example, with reference to the accompanying drawings in which.

Figure 1:
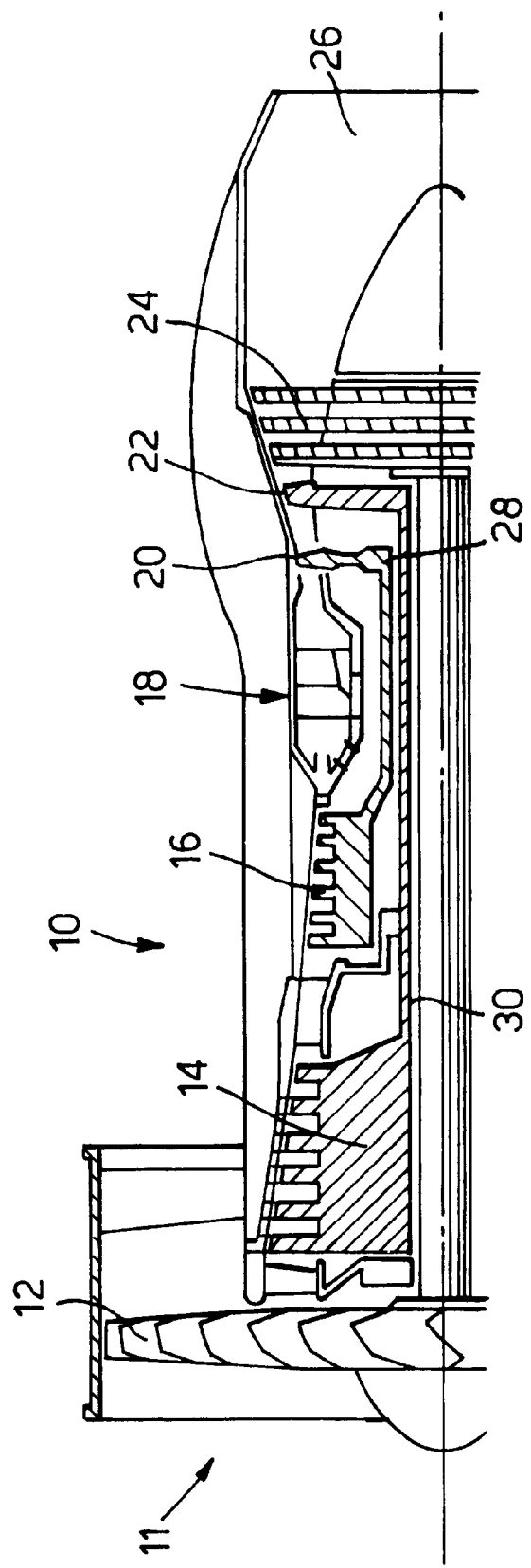
FIG. 1 is a schematic sectioned view of a ducted gas turbine engine

With reference to FIG. 1, a ducted gas turbine engine shown at 10 is of a generally conventional configuration. The gas turbine comprises, in axial flow series, an air intake 11, a propulsive fan 12, an intermediate compressor 14, a high pressure compressor 16, combustion equipment 18, a high pressure turbine 20, an intermediate pressure turbine 22, a low pressure turbine 24 and an exhaust nozzle 26.

The gas turbine engine works in the conventional manner so that air entering the intake 11 is accelerated by the fan 12 to produce two air flows, a first air flow into the intermediate pressure compressor 14 and a second airflow which provides propulsive thrust. The intermediate pressure compressor 14 compressors the airflow directed into it before delivering the air to the high pressure compressor 16 where further compression takes place.

The compressed air exhausted form the high pressure compressor 16 is directed into the combustion equipment 18 where it is mixed with fuel and the mixture combusted. The resultant hot combustion products then expand through and thereby drive the high 20, intermediate 22 and low 24 pressure turbines before being exhausted through the nozzle 26 to provide additional propulsive thrust. The high 24, intermediate 22 and low 20 pressure turbines respectively drive the high 16 and intermediate 14 pressure compressors and the fan 12 by suitable interconnecting shafts.

Figure 2:
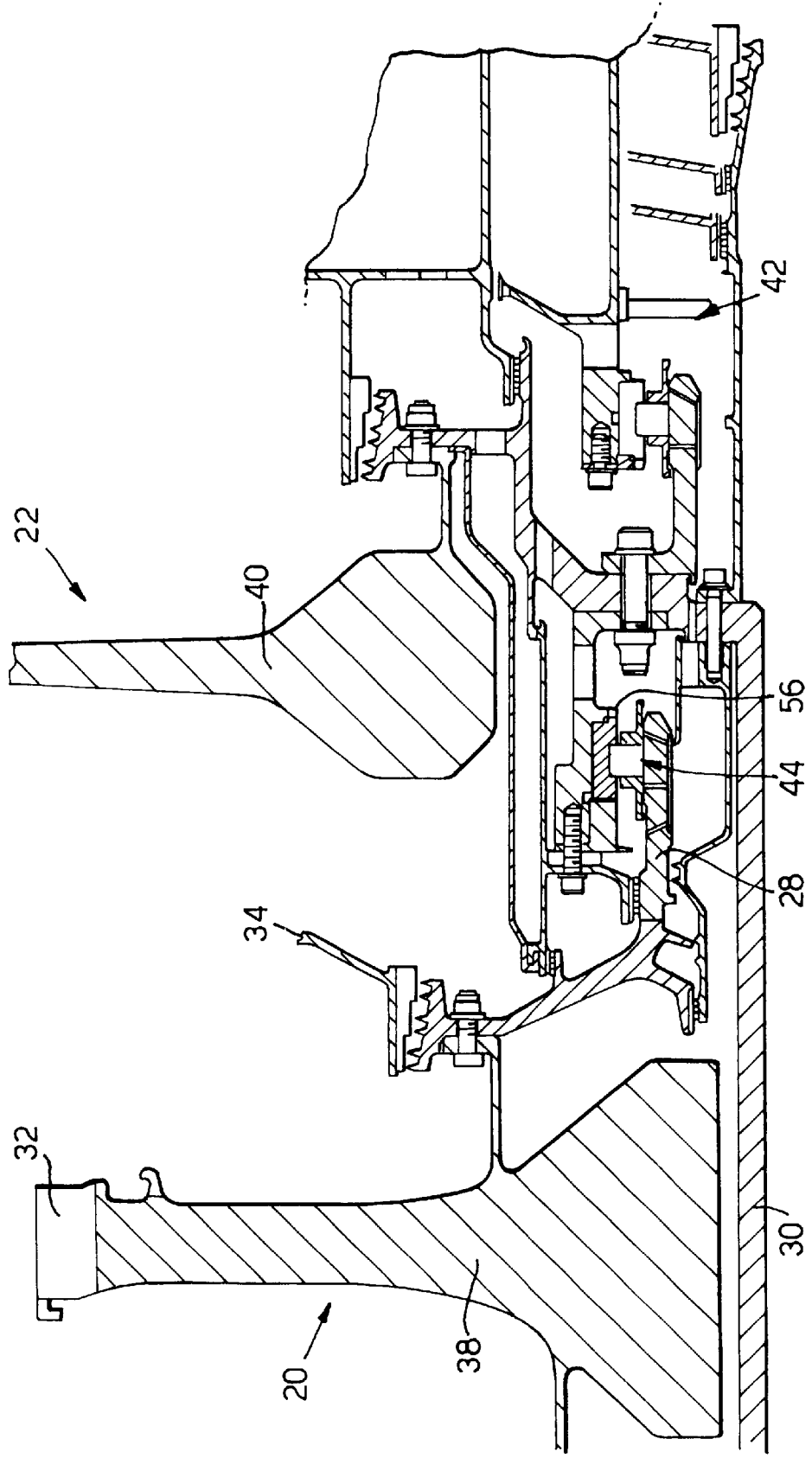
FIG. 2 is a sectioned side view of the high pressure turbine and intermediate pressure turbine and associated bearing chamber of a gas turbine engine.
Figure 3:
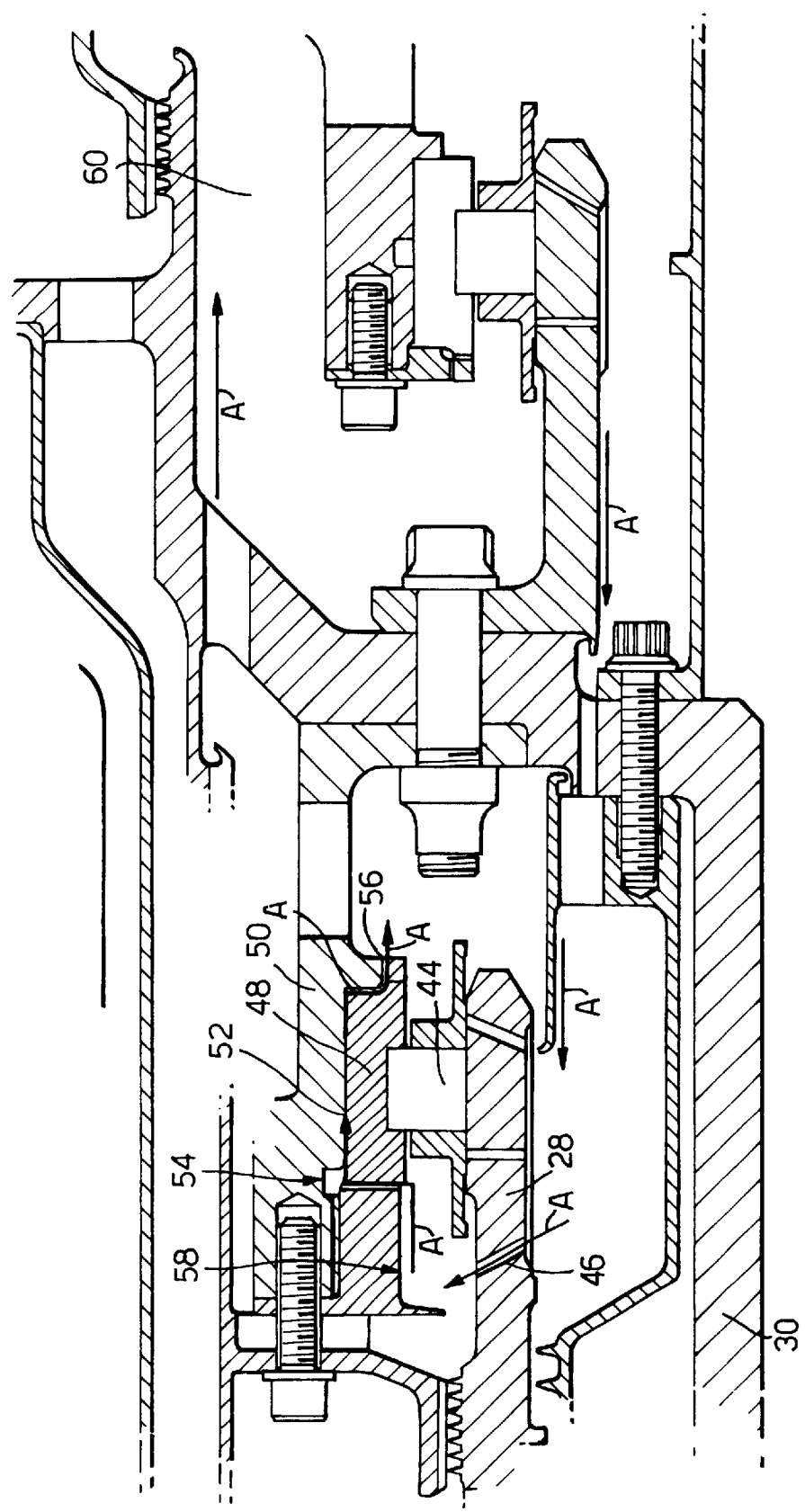
FIG. 3 is an enlarged view of the bearing arrangement of FIG. 2.

Now referring to FIGS. 2 and 3 the high pressure turbine 20 is mounted on the rotating high pressure turbine shaft 28 and the intermediate pressure turbine 24 is mounted on the intermediate pressure turbine shaft 30. Both turbines 20, 22 comprise a plurality of turbine blades 32. To provide the driving torque of the gas turbine engine each turbine 20, 22 comprises a plurality of stages, each stage employing one row of stationary nozzle guide vanes (NGVs) 34 and one row of moving turbine blades 32. It will be appreciated however that this need not necessarily be the case under all circumstances so that it may, for instance, be desirable to have counter-rotating turbines so that it no longer is necessary for stationary nozzle guide vanes to be present.

The nozzle guide vanes 34 are of an aerofoil shape with the passage between adjacent vanes forming a convergent duct. The turbine blades 32 are mounted on respective turbine discs 38, 40.

An intershaft bearing 44 is provided between the rotating intermediate pressure shaft 30 and the high pressure shaft 28. The rotating assembly of the high pressure turbine 20 is supported by the intershaft bearing 44. In order to reduce vibration between the rotating shafts a damping arrangement is provided whereby the intershaft bearing 44 is provided with a squeeze film oil feed. The flow of this oil feed is indicated by arrows A.

This oil supply is provided by oil jets 42 and transferred to the intershaft bearing along dedicated passageways 46.

In use, the concentrically mounted intermediate pressure turbine shaft 30 and high pressure turbine shaft 28 are rotating. Oil is directed into the damping system of the intershaft bearing from an oil jet feed 42 through passageways 46 formed in the high pressure turbine shaft 28. This oil is then directed radially outwards from shaft 28 onto an oil entry surface 58. The oil flows along this entry surface and is then directed between the intershaft bearing outer race 48 and the bearing housing 50 by an oil distributor 54.

The squeeze film of oil 52 is directed into a weir 56 and into the oil scavenge 60. The radial height difference between the weir 56 and the oil entry surface 58 produces a pumping force during operation. Also the radial height difference between the squeeze film surface 52 on the outer race 48 of the intershaft bearing 44 and the weir 56 provides a pressure field.

The oil pressure rise achieved through this system is defined by the equation:

$$\text{Pressure Rise} = \frac{\rho \, \omega^2 (R_1^2 - R_2^2)}{2}$$

where $\rho$ is the density of oil, $\omega$ is the high pressure shaft rotational speed, $R_1$ is the radial height of the squeeze film entry surface 58 and $R_2$ is the radial height of the weir 56.

The different radial positions of the weir 56 and the oil entry surface 58 are essential to provide the pressurised squeeze film oil supply.

The squeeze film formed along this clearance surface dampens the radial motion of the rotating assembly and the dynamic loads transmitted to the bearing housing 50 thus reducing the vibration level of the engine and the possibility of damage by vibration.

During use small debris particles, typically carbon particles that have become suspended in the oil system and not removed by the main oil filters are collected in a sludge trap located with the oil distributor 54. The sludge trap is capable of flushing the damping system of carbon particles of up to 0.0005 inch diameter. Larger metallic debris from broken bearings would need to be removed during an engine overhaul.

Advantageously, a dedicated sealed oil supply for squeeze film damping of intershaft bearing 44 is not required. Hence the complex sealing arrangement also needed for such an independent pressurised system is also not required.

The present invention also advantageously adapts the existing bearing lubrication system to provide a pressurised oil supply for squeeze film vibration damping of an intershaft bearing. The system can be simply adapted to operate over an extensive range of feed pressures without the need for complex sealing arrangement.

The squeeze film damper system of the present invention is both cost effective and lighter than other alternatives.

Also the high pressure turbine may be supported by the intershaft bearing 44, allowing the high pressure/intermediate pressure bearing chamber to be positioned behind the intermediate pressure turbine. This allows the intermediate pressure nozzle guide vane width to be reduced by relocating the oil pipes previously located within the intermediate pressure nozzle guide vanes may now be relocated through the low pressure nozzle guide vanes.

Reduction of the intermediate pressure nozzle guide vane width is now possible hence improving the efficiency of the gas turbine.

We claim:

1. A vibration damper for a bearing located between two rotatable shafts, said bearing comprising an inner race and an outer race said outer race being located adjacent a bearing housing, an axially extending oil entry surface positioned radially inwardly of the radial outer surface of said outer race and axially adjacent one end of said bearing, the outer surface of said bearing outer race forming a clearance between itself and the bearing housing suitable for the ingress of a film of oil directed from said oil entry surface, a weir positioned at the axially opposite end of said bearing, said weir being radially inward of said bearing outer race and said oil entry surface whereby in use the radial height difference therebetween provides a pumping force thus supplying a film of oil between the bearing outer race and its casing.

2. A vibration damper according to claim 1 wherein said bearing is mounted on the high pressure turbine shaft of a gas turbine engine.

3. A vibration damper according to claim 1 wherein said rotatable shafts are mounted concentrically.

4. A vibration damper according to claim 3 wherein means for directing said oil supply onto said entry surface comprise passageways formed within the inner rotating shaft.

5. A vibration damper according to claim 4 wherein said passageways are formed within the high pressure turbine shaft of a gas turbine engine.

6. A vibration damper according to claim 1 wherein said damper is provided with filter means to remove debris from said oil.

7. A vibration damper according to claim 1 wherein an oil distributor is provided to direct said film of oil from said entry surface into the clearance between said bearing housing and said outer race of said bearing.

* * * * *